Figure 1:
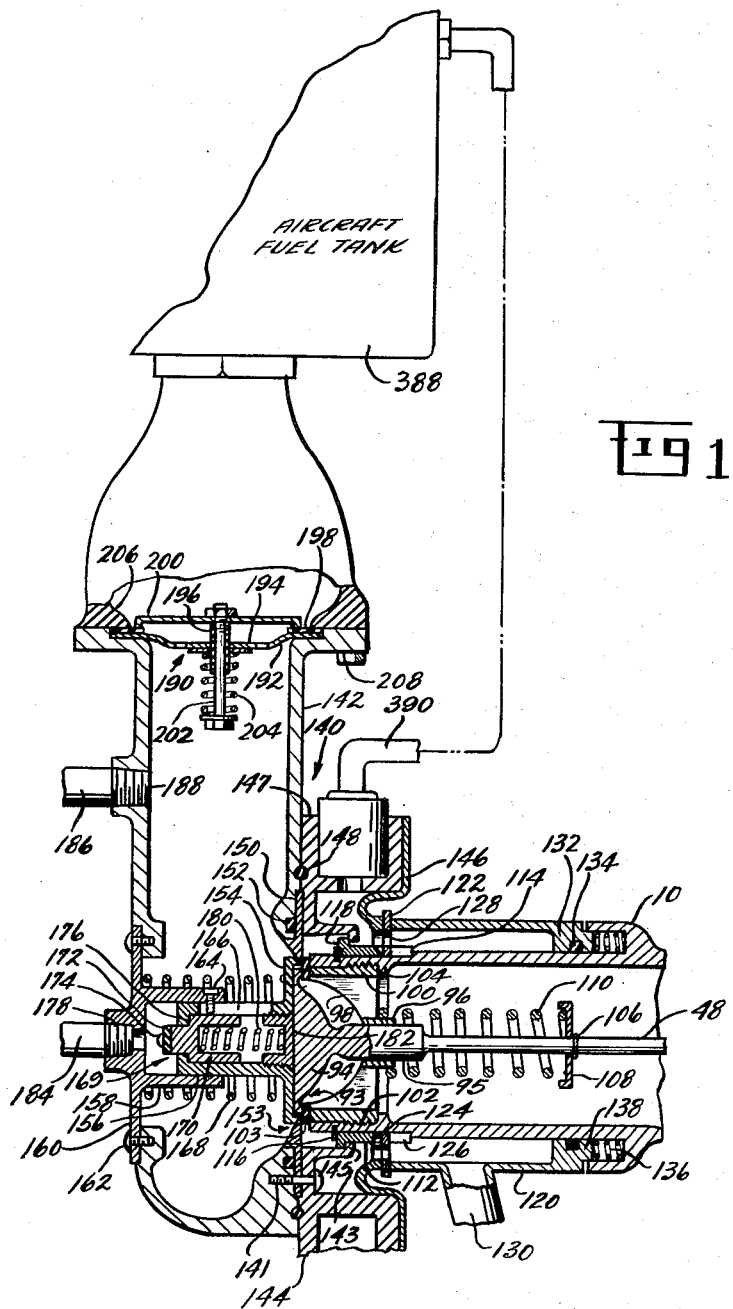

Aug. 18, 1953 D. SAMIRAN 2,649,109
NOZZLE FOR FUEL SERVICING SYSTEMS FOR AIRCRAFT
Original Filed June 2, 1948 2 Sheets-Sheet 2

INVENTOR.
DAVID SAMIRAN
BY Wade Koontz
Frederick W. Cotterman
ATTORNEYS

UNITED STATES PATENT OFFICE 2,649,109

NOZZLE FOR FUEL SERVICING SYSTEM FOR AIRCRAFT

David Samiran, Fort Wayne, Ind.

Original application June 2, 1948, Serial No. 30,713. Divided and this application July 21, 1950, Serial No. 175,279

5 Claims. (Cl. 137—235)

(Granted under Title 35, U. S. Code (1952), sec. 266)

The invention described herein may be manufactured and used by or for the United States Government for governmental purposes without payment to me of any royalty thereon.

This invention is a division of my copending application Serial No. 30,713, filed June 2, 1948, now Patent No. 2,556,221 and relates to a fuel servicing nozzle and is particularly applicable in filling the fuel tanks of an aircraft.

The embodiment of the invention herein disclosed consists of a novel nozzle which is intended to be carried on the end of the servicing hose of a fuel supply truck or other fuel supply vehicle for attachment to a fuel tank or through intermediate means to a manifold through which a plurality of tanks may be serviced.

The nozzle shown comprises means for manually opening the device and locking it in the open position together with means for automatically releasing the locking means, the automatic releasing means responding to resistance to further fuel inflow into the tank or tanks being filled. Means are also included on the discharge end of the nozzle shown for quick attachment or detachment to or from the fuel intake fitting carried by aircraft.

The valving within the nozzle shown comprises dashpot means whereby the closing of the several valves will be retarded, to the end that more quiet valve operation will be had.

The nozzle shown also includes means whereby, when the nozzle is detached from an aircraft fuel intake fitting, the act of detaching the nozzle will seal the discharge opening of the nozzle so that any fuel remaining in the nozzle will remain therein pending subsequent refueling operations.

When the tanks of an aircraft are being filled with fuel through a nozzle of the kind commonly used for this purpose, a large volume of ambient air is being drawn into the truck tank to replace the fuel withdrawn therefrom and coincidentally a large volume of fuel saturated air is being expelled from the aircraft tanks by the fuel entering therein. The amount of fuel saturated air discharged into the ambient air during refueling thus reaches dangerous proportions.

One of the most valuable features of the present invention resides in associating with the bayonet lock which attaches the nozzle to the fuel receiving receptacle a means which coincidentally brings the space above the fuel in the aircraft tank into communication with the space above the fuel in the truck tank, whereby the fuel saturated air driven from the aircraft tanks may be returned to the truck tank thereby greatly safetying the refueling operation.

It is therefore an object of this invention to provide a device made according to the above brief descripton, which will be effective for the purpose indicated, will be of relatively low cost and will function in the manner stated.

Figure 2:
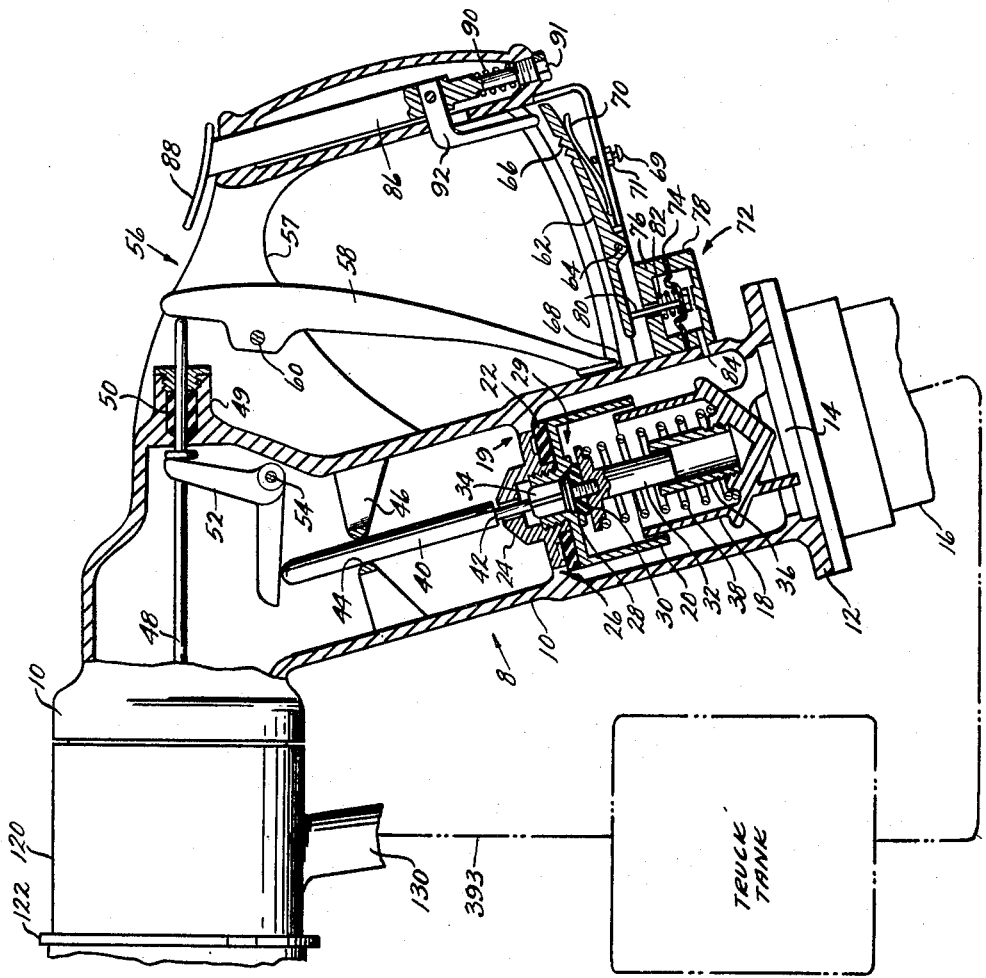

I attain this object in the mechanism hereinafter more fully described, reference being had to the drawing, wherein, the pistol-grip nozzle adapted to be carried by a tank truck and the fuel intake fitting adapted to be carried by an aircraft are shown assembled, the view being taken in axial section, while an aircraft fuel tank and a truck tank are shown schematically. In order to show the assembled view to a sufficiently large scale, the assembly is shown on two sheets, and the two parts of the view designated Fig. 1 and Fig. 2.

The pistol-grip nozzle herein disclosed is, in appearance, much like the one shown in my copending application Serial No. 65,951, filed December 17, 1948, now Patent No. 2,580,446, entitled "Fuel Servicing Nozzle." The nozzles, however, differ considerably in several important details of construction as will hereinafter appear.

In the drawing, the pistol-grip nozzle 8 has a housing 10 with a flange 12 by which its inflow opening 14 may be permanently connected to the hose 16 which extends from a refueling truck. A triple-legged valve guide 18 is concentrically supported in the opening 14, a valve head 20 being freely slidable thereover.

A valve 19 comprises a head 20 which carries a resilient disc 22 of synthetic rubber or the like held in place by the retaining nut 24, and adapted to rest on a seat 26 in the housing 10 of the nozzle 8. A smaller valve 29 has its seat 28 in the valve head 20 and is provided with a resilient disc 30 held between an upper and a lower guide member 32 and 34 respectively, the upper guide member being freely slidable in a tube 36 threadedly attached to the valve guide 18 and the lower guide member being freely slidable in the hub of the valve head 20. A spring 38 reacting against the valve guide 18 urges the valve disc 30 onto its seat 28 which in turn urges the valve disc 22 onto its seat 26, thereby closing both valves. A push-rod 40 for opening the valves has a shoulder 42 slightly spaced apart from the retaining nut 24 and is guided in a ring 44 supported on arms 46 extending inwardly in the housing 10 of the nozzle 8. Because of the space under the shoulder 42, the small valve disc 30 will be raised slightly from its seat 28 before the valve disc 22 is raised off its seat 26, thereby decreasing the effort required to raise the larger valve disc 22.

A relatively long valve rod 48 has sliding bearing in a hub 49 in the outer wall of the housing 10, a packing 50 being provided to prevent leakage at this point. A bell crank 52, pivoted in the housing 10 at 54 is operative to transmit endwise movement from the longer rod 48 to the shorter rod 40.

A handgrip mechanism 56 having a framework 57 integral with or attached to the housing 10 is provided to facilitate attachment of the nozzle. A trigger 58 is hinged on the handgrip 56 at 60 whereby raising of the long arm of the trigger operates the long rod 48, which in turn, by way of the bell crank 52, operates the shorter rod 40. A ratchet-like lever 62 is hinged on the handgrip 56 at 64, this lever having ratchet teeth 66 which a pawl 68, on the end of the trigger 58, may engage. A flat spring 70 urges the teeth 66 into engagement with the pawl 68 when the long arm of the trigger 58 is drawn outward. An adjusting screw 69 with lock nut 71 limits movement of the lever 62.

A trigger release mechanism 72 consists of a diaphragm 74 in a two-part casing 76—78, the diaphragm having an operating rod 80 centrally positioned in, and secured to, the diaphragm. A spring 82 biases the diaphragm to the unoperated position. A small hole 84 is provided for admitting a fluid under pressure to the outer surface of the diaphragm whereby movement of the rod 80, acting through the ratchet lever 62, releases the ratchet teeth 66 from the pawl 68 and thereby allows the valve discs 22 and 30 to seat.

Means is also associated with the trigger release mechanism for tripping the release mechanism manually. It consists of a trip bar 86 having bearing at each end in the framework 57 for sliding movement endwise with the bar, with a thumbpiece 88 at the upper end of the bar and a spring 90 at the lower end biasing the bar toward the thumbpiece. A nut 91 limits movement of the bar 86 in the direction of the thumbpiece. A bracket 92 is secured to the bar 86 in such position that it just touches the outer end of the lever 62 when the ratchet notches 66 are in position for engagement with the pawl 68, whereby, if the thumbpiece 88 is depressed when the pawl 68 and ratchet teeth 66 are engaged, the teeth will be withdrawn from the pawl and the valve discs 22 and 30 will seat.

Carried on the forward end of the long valve rod 48 is a valve 93 having a head 94. An enlarged portion 95 of the rod 48 is slidably supported in a bearing 96 held by ribs 98 which extend radially inward from a valve seat collar 100 which is threaded at the inner end as at 102 into the outer end of the nozzle housing 10, and faced with a suitable seat material at the outer end as at 103, an annular rib 104 in the nozzle housing being provided as an abutment for the valve seat collar 100.

A split collar 106 fixed in a groove in the rod 48 holds a flanged disc 108 against which the spring 110 may act to move the rod 48 rightward, the other end of the spring resting on the ribs 98, whereby the valve head 94 is always urged to the closed position shown.

A rotatable sleeve 112 is slidable over the outflow end of the nozzle housing 10 to the shoulder 114 and, in operation, is kept in position by a spring snap ring 116. The outer end of the sleeve 112 has oppositely extending ears 118 which, upon rotation of the sleeve 112, lock in back of appropriately formed ledges in the fuel intake fitting in the aircraft when refueling is about to be effected.

A jacket 120 surrounds the nozzle housing 10. The outer end of the jacket 120 has a flange 122, the inner diameter of the flange being provided with lugs 124 which extend radially inward into keyways 126 formed in the sleeve 112, whereby rotation of the jacket 120 coincidentally rotates the sleeve 112 when the nozzle 8 is being locked into the fuel intake fitting in the aircraft. Holes 128 are provided so that air or vapor may pass through these holes and into the jacket and out through the hub 130. The hub 130 may be used as a lever for rotating the jacket 120.

The inner end of the jacket 120 has an inturned flange 132 internally grooved for the seal ring 134. Pockets are provided in the nozzle housing 10 for springs 136 and slugs 138 whereby the jacket 120 is given limited axial movement in addition to permissible rotative movement with respect to the nozzle body 10. With this arrangement, the flange 122 of the jacket 120 is always maintained in resilient contact with a gasket carried by the fuel intake fitting on the aircraft.

The fuel intake fitting 140 is carried inside the aircraft and comprises a body 142 and mounting bracket 144, the mounting bracket 144 being secured to the skin 146 of the aircraft preferably in the side of the fuselage, the skin 146 preferably being formed inward to provide an opening 143 into which the nozzle 8 may be inserted, the opening being provided with camming surfaces 145 around its edge under which the ears 118 of the nozzle 8 may be turned when securing the nozzle in servicing position. A hub 147 is provided for connecting the space 149 by suitable piping to the tops of the tanks which are to be filled.

The body 142 and mounting bracket 144 are joined together by screws 141 or similar fastening means, a seal 148 being interposed to prevent leakage therebetween. Body 142 and mounting bracket 144 are both recessed for the valve seat disc 150. A seal 152 is provided to prevent leakage between body 142 and disc 150.

A valve 153 has a head 154 and a hollow stem 156 which is slidable in a hub 158 extending from a closure plate 160 which is held to body 142 by screws 162. A screw 164 threaded into the hub 158 extends into a slot 166 in the hollow stem 156. A relatively heavy spring 168 reacts against the closure plate 160 and valve head 154 to move the valve head onto its seat on the disc 150.

A relatively small valve 169 comprises a valve guide 170 which is slidable in the hollow stem 156. Valve guide 170 is faced with a resilient washer 172 held on by screw 174 and is shouldered at 176 whereby the valve member 170 will not seat the washer 172 onto the valve seat 178 to close the small valve 169 except when the larger valve 153 is opened by insertion of the nose of the nozzle 8 in the opening provided for it in the fuel intake device 140. A spring 180 is carried in the hollow interior of the member 170 urging the valve 169 toward closed position, a threaded plug 182 being provided to take the reaction of the spring 180. Conduits 184 and 186 are provided for valve seat opening 178 and a second opening 188 the purpose of which will later appear.

A check valve 190 comprises a valve seat ring 192 having two inwardly extending legs 194 supporting a valve stem guide hub 196. Ring 192 is faced with a washer 198 of resilient material upon which the valve head 200 rests. A valve stem 202 is slidable in the hub 196, and a spring 204 urges the valve to the closed position. A large pipe fitting 206 is held to the body 142 by screws 208, the ring 194 and washer 198 being clamped between the body 142 and fitting 206.

The considerable difference between the nozzle hereinbefore described and the nozzle shown in the copending application Serial No. 65,951, supra, Patent No. 2,580,446, will now be apparent for while, in the copending application, the chief point of novelty resides in the mechanism whereby, until the nozzle is bayonet locked onto the intake fitting of the aircraft, fuel flow through the nozzle may not be accomplished, and until fuel flow through the nozzle is discontinued, the nozzle may not be detached from the fuel intake fitting, while in the present invention the chief point of novelty resides in the mechanism whereby, when the nozzle is bayonet locked onto the intake fitting of the aircraft the space in the top of the aircraft tank is connected to the space in the top of the truck tank for preventing an excess of fuel saturated vapors being discharged into the ambient air.

The operation of the present invention is substantially as follows:

The nozzle 8 which is permanently attached to a fuel truck by hose 16, is pushed into the opening 143 in the fuel intake device 140, then the sleeve 120 is rotated about ninety degrees using the hub 130 as a lever whereby it is locked in position by the ears 118, passing under the camming surfaces 145. At the same time and with the same movement as fastens the nozzle 8 in place, connection is made by way of the jacket 120 between the hub 147 of the fuel intake fitting 140 and the hub 130 of the nozzle jacket. A length of hose 393 is employed to connect the hub 130 to the top of the supply truck tank, while the pipe 390 connects the hub 147 of the fuel intake fitting 140 to the top of the tank 388, whereby the fuel vapor in the top of the tank 388 will return to the space in the top of the truck tank as solid fuel is transferred from the truck tank to the aircraft tank 388.

When the nozzle is thus secured in the fuel intake device 140 the handgrip 56 is grasped and the trigger 58 is drawn rightward until the pawl 68 catches in and is held by the teeth 66. The act of drawing the trigger to this position opens valves 19, 29, 93, and 153 and closes the valve 169 simultaneously except that the smaller valve 29 opens slightly ahead of the larger valve 19. The fuel, being under pressure, raises the valve 190 and flows through pipe 382 into the aircraft fuel tank 388. The top of the tank 388 is now connected to the top of the tank truck whereby the fuel saturated air forced out of the aircraft fuel tank by the incoming fuel is returned to the top of the truck tank.

Having described my invention, I claim:

1. A refueling nozzle structure which comprises a body having an inlet end and a discharge end, its inlet end adapted for connection to a pressurized fuel supply tank and its discharge end adapted for quick connection or disconnection to or from a fuel intake fitting, a valve near the inlet end, a second valve at the extreme discharge end, a hand-grip trigger pivoted on said body, linkage connecting said trigger to said valves for opening both valves simultaneously, a latch for retaining said trigger in the valve-open position, manually operable means for releasing said latch, and pressure actuated automatic latch releasing means operative by an increase in pressure in said nozzle upstream of said second valve.

2. The apparatus defined in claim 1 with means containing a passageway associated with a bayonet lock for securing said nozzle in position effective upon operation of said bayonet lock in securing said nozzle in position to place the space above the fuel in the aircraft tank in communication with the space above the fuel in the supply tank.

3. In combination with a fuel intake fitting having a vent connected to the upper portion of a fuel tank, a fuel flow line from a supply means, a dispensing nozzle on said fuel flow line having rotatable locking means adapted to securely engage the fuel intake fitting, a spring biased sleeve concentric with the dispensing nozzle and operatively associated with said lock means to rotate said lock means, a passage through said sleeve to mate with the vent in the intake fitting upon locking said nozzle to the fuel intake fitting, and a vent line from said passage in said sleeve adapted to be connected to the supply means whereby the fuel vapor in the fuel tank may be directed to the supply means on refueling.

4. A fuel dispensing device comprising, a fuel flow line from a supply means, a dispensing nozzle on said flow line, a rotatable locking sleeve on said nozzle adapted to engage the intake of a fuel tank, a spring biased sleeve concentric with said nozzle and spaced therefrom and connected to said locking sleeve to rotate said locking sleeve to locked position, a passage in said spring biased sleeve adapted to be connected to a vent in the tank being refueled, and a return line connected to said passage adapted to be connected to the supply means whereby the fuel vapor in the tank being refueled may be directed to the supply means.

5. A fuel dispensing device comprising a fuel flow line from a fuel supply means, a dispensing nozzle on said flow line, a rotatable locking sleeve on said nozzle adapted to engage the intake means on a fuel tank having a vent, a safety sleeve concentric with the flow line and connected to the locking sleeve for rotating therewith, an annular flanged shoulder on said flow line, biasing means intermediate said shoulder and said safety sleeve normally biasing said safety sleeve into sealing engagement with the intake means on the fuel tank, a passage through said safety sleeve adapted to be connected to the vent in the fuel tank on connection of the nozzle to the fuel tank, and a manually operable tubular handle on the safety sleeve operable to rotate the sleeves to provide a locking engagement of the locking sleeve with the fuel intake and to provide a vent return passage from the safety sleeve to the supply means.

DAVID SAMIRAN.

References Cited in the file of this patent
UNITED STATES PATENTS

| Number | Name | Date |
|---|---|---|
| 1,515,844 | Dorris | Nov. 18, 1924 |
| 1,655,312 | Daniel | Jan. 3, 1928 |
| 2,090,734 | Piquerz | Aug. 24, 1937 |
| 2,461,312 | Dahlem | Feb. 8, 1949 |
| 2,556,221 | Samiran | June 12, 1951 |